US011188927B2

(12) United States Patent
Kresge

(10) Patent No.: US 11,188,927 B2
(45) Date of Patent: Nov. 30, 2021

(54) INITIATING CARDSWAP BASED ON ANALYTIC MODEL INDICATING THIRD PARTY CARD REISSUANCE

(71) Applicant: Capital One Services, LLC, McLean, VA (US)

(72) Inventor: James Kresge, Henrico, VA (US)

(73) Assignee: Capital One Services, LLC, McLean, VA (US)

(*) Notice: Subject to any disclaimer, the term of this patent is extended or adjusted under 35 U.S.C. 154(b) by 84 days.

(21) Appl. No.: 16/655,046

(22) Filed: Oct. 16, 2019

(65) Prior Publication Data
US 2021/0117988 A1 Apr. 22, 2021

(51) Int. Cl.
G06Q 20/00 (2012.01)
G06Q 30/02 (2012.01)
G06Q 30/08 (2012.01)
G06Q 40/02 (2012.01)
G06Q 20/34 (2012.01)
G06N 3/06 (2006.01)
G06Q 20/32 (2012.01)
G06Q 20/20 (2012.01)

(52) U.S. Cl.
CPC ........... *G06Q 30/02* (2013.01); *G06N 3/06* (2013.01); *G06Q 20/20* (2013.01); *G06Q 20/32* (2013.01); *G06Q 20/351* (2013.01); *G06Q 30/08* (2013.01); *G06Q 40/02* (2013.01)

(58) Field of Classification Search
CPC .. G06Q 20/36; G06Q 20/3674; G06Q 20/363; G06Q 20/02; G06Q 20/105; G06Q 20/12; G06Q 20/382; G06Q 20/40; G06Q 20/4016; G06Q 20/401; G06Q 20/34; G06Q 30/0601

See application file for complete search history.

(56) References Cited

U.S. PATENT DOCUMENTS

| 5,744,787 | A | * | 4/1998 | Teicher | G07F 11/30 235/380 |
|---|---|---|---|---|---|
| 6,076,075 | A | * | 6/2000 | Teicher | G06Q 20/10 235/375 |
| 2007/0106582 | A1 | * | 5/2007 | Baker | G06Q 40/08 705/35 |
| 2009/0171839 | A1 | * | 7/2009 | Rosano | G06Q 20/403 705/40 |
| 2009/0265269 | A1 | | 10/2009 | Stoecker | |
| 2016/0117679 | A1 | * | 4/2016 | Braski | G06Q 20/322 705/64 |
| 2017/0046679 | A1 | * | 2/2017 | Gotlieb | G06Q 20/351 |
| 2018/0165728 | A1 | * | 6/2018 | McDonald | G06Q 30/0241 |
| 2019/0114611 | A1 | * | 4/2019 | Tripathi | G06Q 20/229 |

* cited by examiner

Primary Examiner — Mike Anderson
(74) Attorney, Agent, or Firm — Kacvinsky Daisak Bluni PLLC

(57) ABSTRACT

Various embodiments are directed to initiating or triggering a cardswap action for a customer based on a determination that one or more third-party cards associated with the customer have likely been reissued. The determination may be based on the analysis performed by an analytics model on customer transaction data corresponding to the customer. The analytics model may be trained using various patterns, trends, or characteristics observed in the customer transaction data around a timeframe of an actual reissue event. When a likely reissue event has been determined, one or more customer cards may be presented to the customer for swapping out the reissued third-party cards with a customer card.

20 Claims, 8 Drawing Sheets

202

┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ *THIRD-PARTY 1, CREDIT CARD 1:  XXXX-XXXX-XXXX-1234  EXP: 12/18* │  ↘ 204
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

*THIRD-PARTY 1, CREDIT CARD 1:  XXXX-XXXX-XXXX-5457  EXP: 12/23*

*PENDING TRANSACTIONS 206:*

| | | |
|---|---|---|
| 12/8 | SUBSCRIPTION SERV. | $9.99 |
| 12/8 | ONLINE RETAILER 3 | $12.77 |
| 12/8 | UTILITIES COMPANY | $99.40 |
| 12/7 | ONLINE RETAILER 2 | $19.80 |
| 12/7 | ONLINE RETAILER 2 | $54.25 |
| 12/7 | ONLINE STREAM. SERV. | $10.99 |

*PAST TRANSACTIONS 208:*

| | | |
|---|---|---|
| 11/30 | COFFEE SHOP | $2.20 |
| 11/26 | TOY STORE | $57.36 |
| 11/24 | BAKERY | $3.27 |
| 11/20 | PET STORE | $22.20 |
| 11/14 | DONUT SHOP | $4.50 |
| 11/8 | GAS STATION | $19.25 |
| 11/5 | FAST FOOD RESTAURANT | $10.67 |
| 11/2 | GROCERY STORE | $57.30 |

```
RECEIVE CUSTOMER TRANSACTION DATA AND PERFORM
ANALYSIS ON THE SAME BASED AT LEAST IN PART ON AN
ANALYTICS MODEL
602
```

```
DETERMINE WHETHER A REISSUE EVENT HAS OCCURRED,
LIKELY OCCURRED, OR WILL OCCUR FOR A CUSTOMER
BASED ON THE ANALYSIS
604
```

```
INITIATE CARDSWAP BY IDENTIFYING ONE OR MORE
CUSTOMER CARDS
606
```

```
PRESENT THE IDENTIFIED ONE OR MORE CUSTOMER
CARDS TO THE CUSTOMER FOR SELECTION OR
CONFIRMATION
608
```

```
RECEIVE A SELECTION OR CONFIRMATION FROM THE
CUSTOMER OF A CARD AND PERFORM THE CARDSWAP
610
```

*FIG. 6*

INITIATING CARDSWAP BASED ON ANALYTIC MODEL INDICATING THIRD PARTY CARD REISSUANCE

BACKGROUND

Different types of consumer cards, such as credit cards, debit cards, gift cards, etc. may be placed on file with retailers, services, and the like to purchase various goods and use various services. Some services, such as online streaming, ride sharing, or hospitality services, require its users to place a card on file prior to use.

Over time, however, the card numbers associated with the consumer cards may change for a variety of reasons. For instance, the consumer cards may expire after a predetermined time. In another instance, the consumer cards may be lost or stolen. In these or other instances, the consumer cards may be reissued by the financial institutions or companies associated with these cards.

When the card numbers change, consumers may replace or swap the defunct cards that are on file with the retailers, services, etc. with active cards. This process can be burdensome for the consumer, however. While it may be beneficial for a card-issuing company to send notifications to consumers requesting capability for replacing a card on file, such notifications received not in a time of need may be viewed by consumers as annoying. There is a need, thus, for a card-issuing company to determine a need for replacing a card on file, such as whether third-party or competitor cards associated with its customers have been reissued, and offer to swap the existing third-party cards with a card associated with the card-issuing company.

SUMMARY

Various embodiments are generally directed to initiating or triggering a cardswap action for a customer based on a determination that one or more third-party cards associated with the customer have likely been reissued. The determination may be based on the analysis performed by an analytics model on customer transaction data corresponding to the customer. The analytics model may be trained using various patterns, trends, or characteristics observed in the customer transaction data around a timeframe of an actual reissue event. When a likely reissue event has been determined, one or more customer cards may be presented to the customer for swapping out the reissued third-party cards with a customer card.

BRIEF DESCRIPTION OF THE DRAWINGS

FIG. 2 illustrates example customer transaction data around a reissue event in accordance with one or more embodiments.

FIG. 6 illustrates another example of a flow diagram in accordance with one or more embodiments.

DETAILED DESCRIPTION

Figure 1:
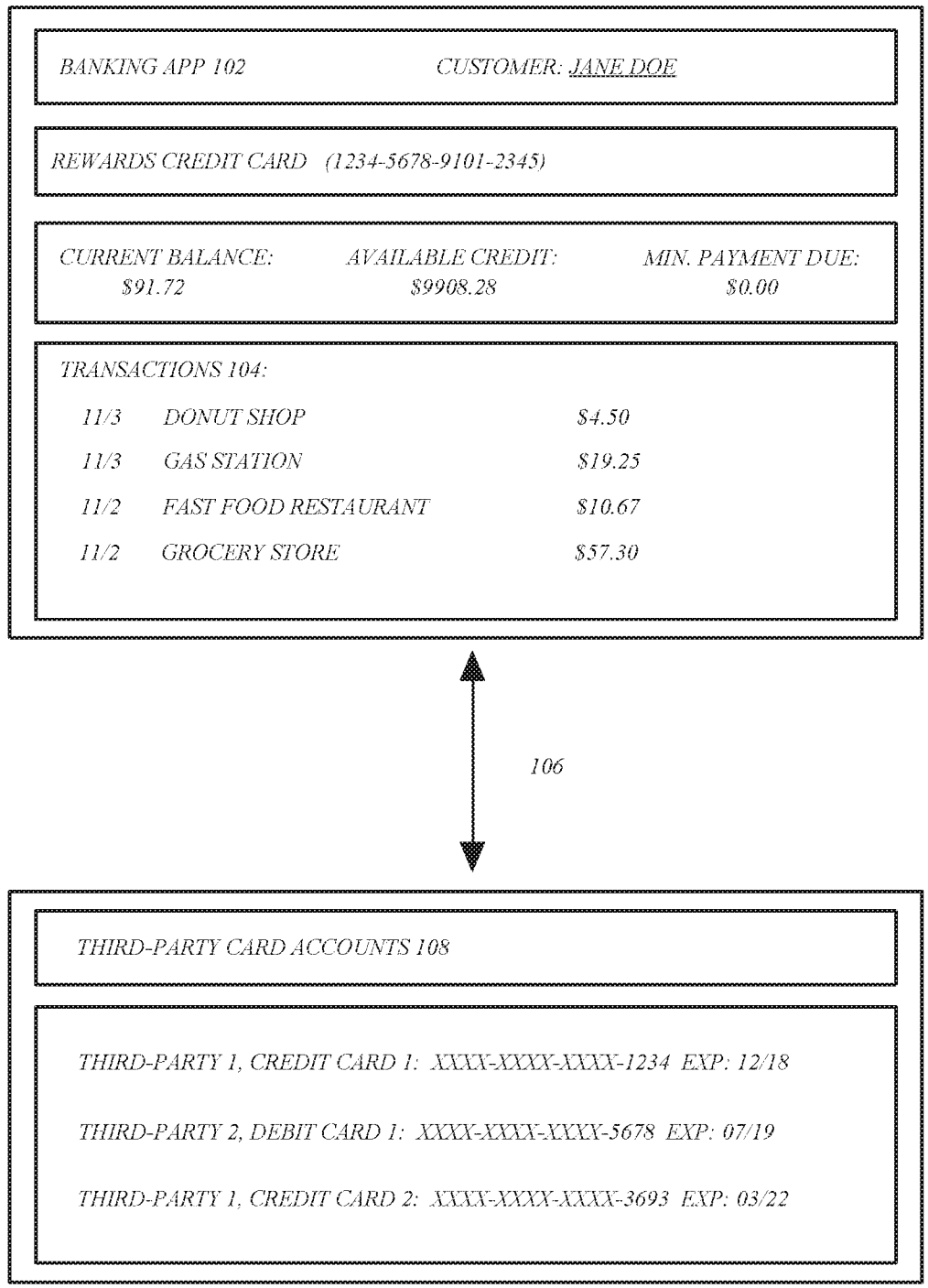
FIG. 1 illustrates an example customer banking account linked to third-party accounts in accordance with one or more embodiments.

Various embodiments are generally directed to initiating a cardswap action for a customer (e.g., a customer of a financial company) based on a determination that a third-party card associated with the customer was likely reissued. In examples, a trained analytics model may be used to determine whether a reissue event has occurred, likely occurred, or will occur by analyzing customer transaction data. The cardswap action may include identifying one or more customer credit or debit cards to present to the customer for swapping and replacing the existing third-party card on file with a customer card (e.g., a credit card, debit card, virtual card).

It may be understood that any term herein that is modified by "customer" refers to, for example, an association with a card-issuing company, such as the above financial company. Thus, a customer credit or debit card refers to a card issued by the financial company to a customer. Similarly, customer transaction data refers to transaction data associated with the customer recorded by and maintained at the financial company. Moreover, it may be understood that a term modified by "third-party" refers to, for instance, an association with any company or entity other than the financial company. Thus, a third-party may be a competitor of the financial company.

In embodiments, the financial company may allow a customer to link one or more of the customer's third-party card accounts via a banking application. To at least that end, it may be possible for the financial company to monitor when a reissue event, e.g., the reissuance of a third-party card, occurs for that customer. For example, it may be highly likely that a third-party card was reissued if one or more numbers of the third-party card changes, such as the last four digits, the expiration date, etc.

When the reissue event does occur, the customer transaction data associated with that customer corresponding to a timeframe around the reissue event may be analyzed to determine one or more patterns, trends, and/or characteristics thereof, which may include a change in spending pattern, a change in spending volume, increase in use of a customer card, use of a customer card at a new merchant or a merchant that the customer does not commonly shop with, new or unexpected recurring charges, placing a customer card on file with a company, etc. It may be understood that this or similar types of analyses may be applied to all customers that have linked their third-party card accounts.

According to embodiments, an analytics model may be trained based on the determined one or more patterns, trends, and/or characteristics in the customer transaction data. The analytics model may be a classification model (a machine learning model or otherwise), which may be referred to herein as a "reissue analytics model." Thus, the trained reissue analytics model may be used to perform analysis on customer transaction data associated with customers that have not linked their third-party card accounts to determine patterns, trends, and/or characteristics that may indicate a reissue event. In at least that regard, the reissue analytics model may be able to predict reissue events based entirely on customer transaction data.

Upon determining a possible reissue event, a cardswap action may be initiated for the customer. In examples, available customer cards, such as a credit card, a debit card, a virtual card, or the like may be identified and presented to the customer for selection or confirmation. It may be understood that the virtual card may be a virtual number associated with a customer credit card, a debit card, or any customer account. The customer cards may be presented to the customer in an e-mail, a text message, a call, a notification message, a mobile banking application message, etc. If multiple customer cards are presented, the customer may select one card for the cardswap. If only one customer card is identified and presented, the customer may confirm that card for the cardswap. The cardswap may then be automatically performed, where the existing third-party card on file is replaced with the selected or confirmed customer card. In some examples, a browser extension may perform the cardswap by navigating to a site and replacing the existing card on file at that site with the new card information.

In previous solutions, the onus has been on the consumers to swap out existing cards on file after they have been reissued. The embodiments and examples described herein overcome and are advantageous over the previous solutions in that by proactively determining whether a customer has experienced a reissue event, the financial company may automatically and dynamically initiate a cardswap in realtime to supplant a third-party or competitor card with a customer card, and thereby develop a primary spending relationship with the customer.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example an example customer banking account linked to one or more third-party accounts according to one or more embodiments. A financial company may provide a customer, Jane Doe, access to a banking app 102. As shown, the banking app 102, via an interface, shows various information related to a "Rewards Credit Card" having a card number 1234-5678-9101-2345. For instance, the banking app interface shows a current balance ($91.72), available credit ($9908.28), minimum payment due ($0.00), and a list of transactions 104.

By way of example, the banking app 102 may allow the customer to link one or more third-party card accounts 108, which is depicted by the double-headed arrow 106. As shown, the customer may link three different third-party accounts: "third-party 1, credit card 1," "third-party 2, debit card 1," and "third-party 1, credit card 2," each of which includes at least the last four digits of the card number and the expiration date of the card. Both third-party 1 and third-party 2 may be competitor companies of the financial company. Thus, by way of the linking process, the financial company may monitor the third-party card accounts 108 to identify any reissuance of the cards, and/or based on the monitoring of the third-party accounts, the data can indicate or identify which merchants (online or otherwise) the customer may have the third-party cards on file so that cardswapping can be performed at those merchants. Moreover, it may be understood that by linking the third-party cards accounts, the financial company can also monitor and acquire third-party data, such as the various numbers (card numbers, expiration numbers, security code number, etc.) associated with the third-party cards, and third-party transaction data, including purchases, transactions, one-time or recurring charges, and so on made with the third-party cards.

FIG. 2 illustrates example customer transaction data around a reissue event according to one or more embodiments. During the monitoring of the third-party card accounts 108 of FIG. 1, it may be determined that the third-party 1, credit card 1 has expired (as indicated by the dashed box 202) and subsequently reissued (as indicated by the arrow 204). As shown, the last four digits of the third-party 1, credit card 1 changed from "1234" on the expired card to "5457" on the new card. Moreover, the expiration date has been updated from "12/18" to "12/23." In embodiments, the exact date of the reissue event may also be determined. For example, in FIG. 2, it may be determined the reissuance of the third-party 1, credit card 1 may have occurred on December 6th, e.g., the date when the last four digits of the card and the expiration date changed.

According to examples, the customer transaction data associated with the customer's Rewards Credit Card may be analyzed corresponding to a timeframe around the reissue date of the third-party 1, credit card 1. It may be understood that the timeframe may be predetermined or customized to a desirable length of time, e.g., several days, several weeks, a month, several months, etc. As shown, the customer transaction data includes a set of pending transactions 206 and a set of past transactions 208. Around the reissue date of December 6th, at least six different pending transactions 206 have been authorized on the Rewards Credit Card within a span of two days. The first three pending transactions (online streaming service, online retailer 1, and online retailer 2) occurred the day after the reissue date. The next three pending transactions (utility company, online retailer 3, and a subscription service) occurred two days after the reissue date.

Analysis of the pending transactions 206 and the past transactions 208 may reveal one or more patterns, trends, and/or characteristics. In one example, a comparison of the pending transactions 206 and the past transactions 208 reveals a change in spending pattern. Each of the past transactions is separated by at least two days, whereas the pending transactions are all clustered around two days. In another example, the analysis reveals a change in spending volume. In almost a month between November 2nd and November 30th, the past transactions 208 totaled only $176.75, while the pending transactions in two days between December 7th and December 8th total $207.20. In yet another example, it may be determined that the customer has used the Rewards Credit Card more often after the reissue date than the customer ever has since opened the account. In a further example, the analysis may reveal transactions at new or uncommon merchants, such as the numerous online merchants in the pending transactions 206. In an additional example, there may be unexpected or recurring charges, such as the subscription service for $9.99 or the utility company charge for $99.40. In another example, the analysis may reveal that the Rewards Credit Card has been placed on file by the customer with a new company, such as the online streaming service company associated with the charge on December 7th.

It may be understood that the analysis of the customer transaction data may be more expansive and other types of patterns, trends, and/or characteristics in the data around or at the reissue event may be revealed. Moreover, it may be understood that the above-described analysis may be applied and used for all customers of the financial company that have linked third-party card accounts.

In embodiments, a reissue analytics model may be trained using the pattern, trend, and characteristic data acquired from the above-described analyses, which may be included in a training data set. To at least that end, the reissue analytics model may be applied to any customer transaction data and may be able to determine customer behavior that is indicative of a reissue event.

Figure 3:
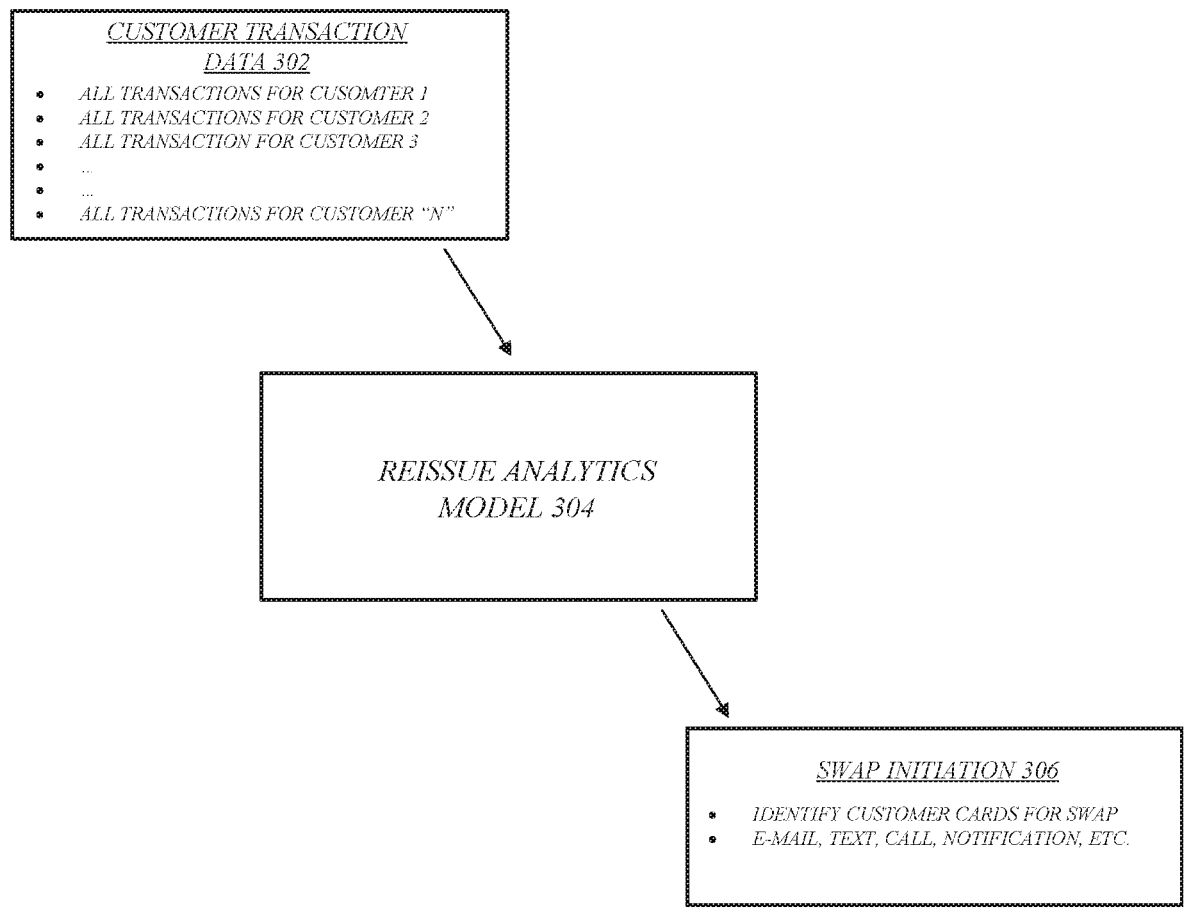
FIG. 3 illustrates an example input and an example output of a reissue analytics model in accordance with one or more embodiments.

FIG. 3 illustrates an example input and an example output of a reissue analytics model 304 according to one or more embodiments. In an example, the financial company may globally run customer transaction data 302 through the reissue analytics model 304. As shown, the customer transaction data 302 may include all transactions for customer 1, all transactions for customer 2, all transactions for customer 3, and all transactions for the customer "N," where N represents a predefined number. Thus, customer transaction data for a small batch of customers (or even a single customer) may be input to the reissue analytics model 304, where N may be 20, or the data may be for a large batch of customers where N may be 10,000. Or the transactions for all customers of the financial company may be input to the reissue analytics model 304.

As described above, the reissue analytics model 304 may be configured to determine a likely reissue event. According to embodiments, the reissue analytics model 304 may be a logistic regression model, a decision tree model, a random forest model, a Bayes model, or any other suitable classification model, one or more of which may be based on a convolutional neural network (CNN) algorithm, a recurrent neural network (RNN) algorithm, a hierarchical attention network (HAN) algorithm, or the like.

The results of the analysis performed by the reissue analytics model 304 may then be applied to a swap initiation process 306, which may involve identifying one or more customer cards to be presented to the customers for cardswap, and sending an e-mail, a text message, a notification, etc. to the customer for either a selection of a customer card from a set of customer cards or a confirmation of a single customer card for the cardswap. In some examples, when identifying the one or more customer cards to be presented to the customer, several factors may be considered, whether the customer cards presented have sufficient available balance, the expiration dates of the customer cards, the customer cards having different spending patterns, increased use, new or recurring charges, etc. Thus, the process of selecting which customer cards to present to the customer for cardswap may be based on more than identifying the cards, but also a determination of which cards make the best candidates for the cardswap.

Figure 4:
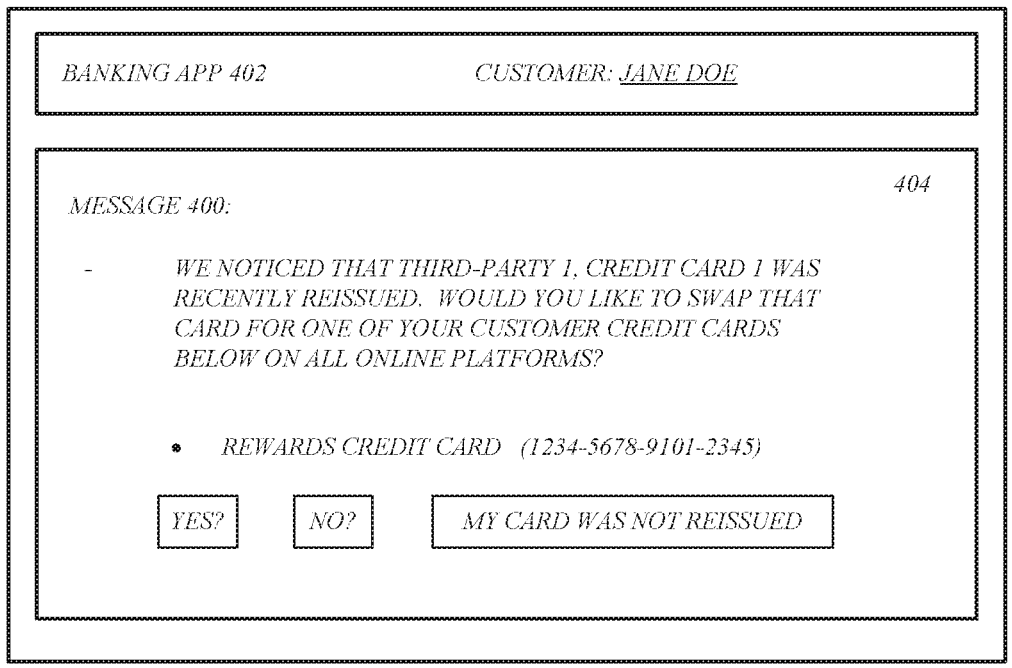
FIG. 4 illustrates an example cardswap message in accordance with one or more embodiments.

FIG. 4 illustrates an example cardswap message 400 according to one or more embodiments. As shown, the cardswap message 400 may be a notification message presented to the customer, Jane Doe, on a banking app 402, which is similar to the banking app 102 shown in FIG. 1. The banking app 402 may have a messaging interface 404, which allows the financial company to communicate with the customer and vice versa.

For example, the cardswap message 400 may recite "we noticed that third-party 1, credit card 1 was recently reissued. Would you like to swap that card for one of your customer credit cards below on all online platforms?" Below that message, a list of customer cards, such as the Rewards Credit Card discussed above with respect to FIGS. 1 and 2, may be presented to the customer. The customer may press the "yes" icon, the "no" icon or the "my card was not reissued" icon. The yes icon serves as a confirmation of the cardswap. It may be understood that if more than one customer card is presented as options for the cardswap, the customer may press the desired card on the interface 404. If the no icon is selected, no action is taken. Moreover, the selection of the "my card was not reissued" icon may indicate a false positive of a reissue event, and a response that recites "we're sorry for the inconvenience" or a similar message may be relayed back to the customer. The false positive occurrence may be used as another data point for further training the reissue analytics model.

If a cardswap action is initiated, the existing card may be automatically swapped with the new card or card information selected by the user. According to embodiments, a browser extension may perform the cardswap by navigating to a website and replacing the existing card on file at that site with the new card information. In examples, a payment update engine may perform the cardswap update and navigate the website via one or more rules. For instance, the payment update engine may go to a website via an address, and to a particular webpage having payment token information, and may determine whether the website includes the payment token information. If not, the payment update engine may continue to navigate to a correct webpage. If the payment update engine determines that it is on the correct webpage, e.g., the webpage including the payment token information, the payment update engine may cause an update to the payment token information, e.g., replace a credit card number with the new credit card information or number. For example, the payment update engine may determine each element having the payment token information on the webpage and provide the correct information in these elements. Further, the payment update engine may notify the user of the automatic update that was performed.

Figure 5:
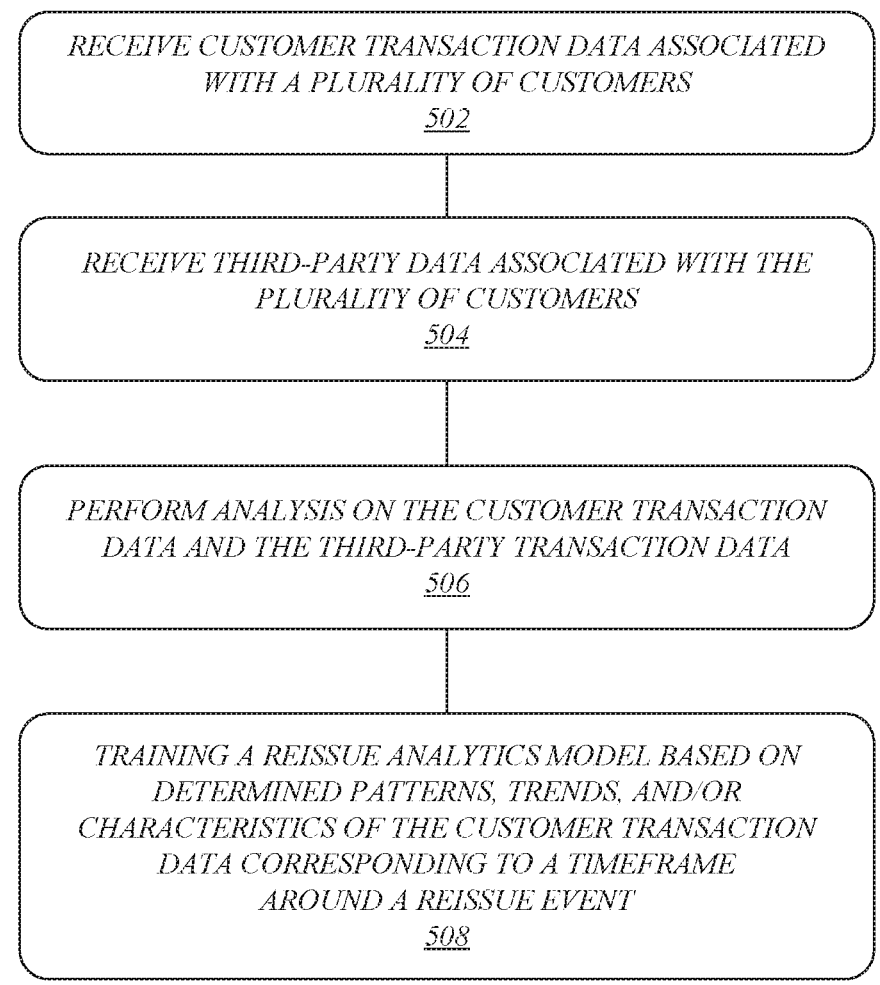
FIG. 5 illustrates an example flow diagram in accordance with one or more embodiments.

FIG. 5 illustrates an example flow diagram 500 according to one or more embodiments. The flow diagram 500 is related to the analysis of customer transaction data and the training of a reissue analytics model based on the analysis. It may be understood that the features associated with the illustrated blocks may be performed or executed by one or more computing devices and/or processing circuitry contained therein.

At block 502, customer transaction data associated with a plurality of customers may be received. For example, the customer transaction data may include various purchases made by the plurality of customers, various financial transactions, one or more withdrawals, one or more deposits, one or more recurring or one-time charges, and the like.

At block 504, third-party data associated with the plurality of customers may be received. In examples, the third-party data may include data related to the numbers associated with third-party cards, such as the card numbers, card expiration dates, card security codes, and so on. Moreover, similar to the customer transaction data at block 502, the third-party data may include third-party transaction data, such as purchases, financial transactions, withdrawals, deposits, recurring or one-time charges, and the like made with the third-party cards. As described above, the third-party data may be acquired from linked third-party card accounts to customer accounts via, for instance, a banking application.

At block 506, the analysis may be performed on both the customer transaction data and the third-party data. The analysis may include identifying at least one reissue event based on the received third-party data. As described above, an example of a likely reissue event may be when one or more numbers, such as the last four digits or the expiration date, of a third-party card changes. Moreover, the analysis may include determining one or more patterns, trends, and/or characteristics in the customer transaction data based on an analysis of the customer transaction data corresponding to a predetermined timeframe around the likely reissue event, which may include changes in spending patterns, changes in spending volume, increase in card use, use at new or uncommon merchants, new or unexpected charges, recurring charges, placing cards on file with companies, etc.

At block 508, the reissue analytics model may be trained based on the one or more patterns, trends, and/or characteristics of the customer transaction data determined at block 506. The pattern, trend, and characteristic data may be included in a training data set for the reissue analytics model.

It may be understood that the blocks illustrated in FIG. 5 are not limited to any specific order. One or more of the blocks may be performed or executed simultaneously or near simultaneously.

FIG. 6 illustrates an example flow diagram 600 according to one or more embodiments. The flow diagram 600 is related to applying the reissue analytics model to the global set of customer transaction data to identify potential reissue events and the initiation of the cardswap process. As set forth above, it may be understood that the features associated with the illustrated blocks may be performed or executed by one or more computing devices and/or processing circuitry contained therein.

At block 602, customer transaction data may be received, and analysis may be performed thereon based at least in part on an analytics model, which may be the reissue analytics model that is trained at block 508 in FIG. 5.

At block 604, it is determined whether a reissue event has occurred, likely occurred, or will occur for a customer based on the analysis performed at block 602. In at least this regard, a reissue event can be accurately predicted based entirely on analyzing customer data via the reissue analytics model, which is advantageous for customers who have not linked their third-party card accounts.

At block 606, when there has been a reissue event for a customer, a cardswap action may be initiated, which includes identifying one or more customer cards (credit, debit, virtual, etc.) to be presented to the customer. In examples, a determination may be made as to which customer cards should be presented to the customer, as described above. For instance, customer cards having lower balances (and thus higher available credit), cards that have already been used as a "replacement" for the reissued third-party card, and/or cards that are active longer (e.g., longer expiration dates) may be some factors to consider when determining which customer cards to present.

At block 608, the one or more identified or determined cards may be presented to the customer for selection or confirmation via an e-mail, a text message, a phone call, a notification message on a banking app, etc. In examples, selection relates to the customer selecting a single card from a list of cards. Confirmation relates to when only a single card is presented to the customer, where the customer may simply confirm the card.

At block 610, the selection or confirmation from the customer is received, and the cardswap action is performed, e.g., automatically replacing the existing third-party card on file with the selected or confirmed customer card. For example, the cardswap may be performed on or for an online retailer, an online media-service provider, an online subscription, an online newspaper or periodical, a social media service, an online gaming service, a ridesharing service, a hospitality service, an online food ordering service, or any other suitable company or service that allows the customer cards to be placed on file.

Again, it may be understood that the blocks illustrated in FIG. 6 are not limited to any specific order. One or more of the blocks may be performed or executed simultaneously or near simultaneously.

Figure 7:
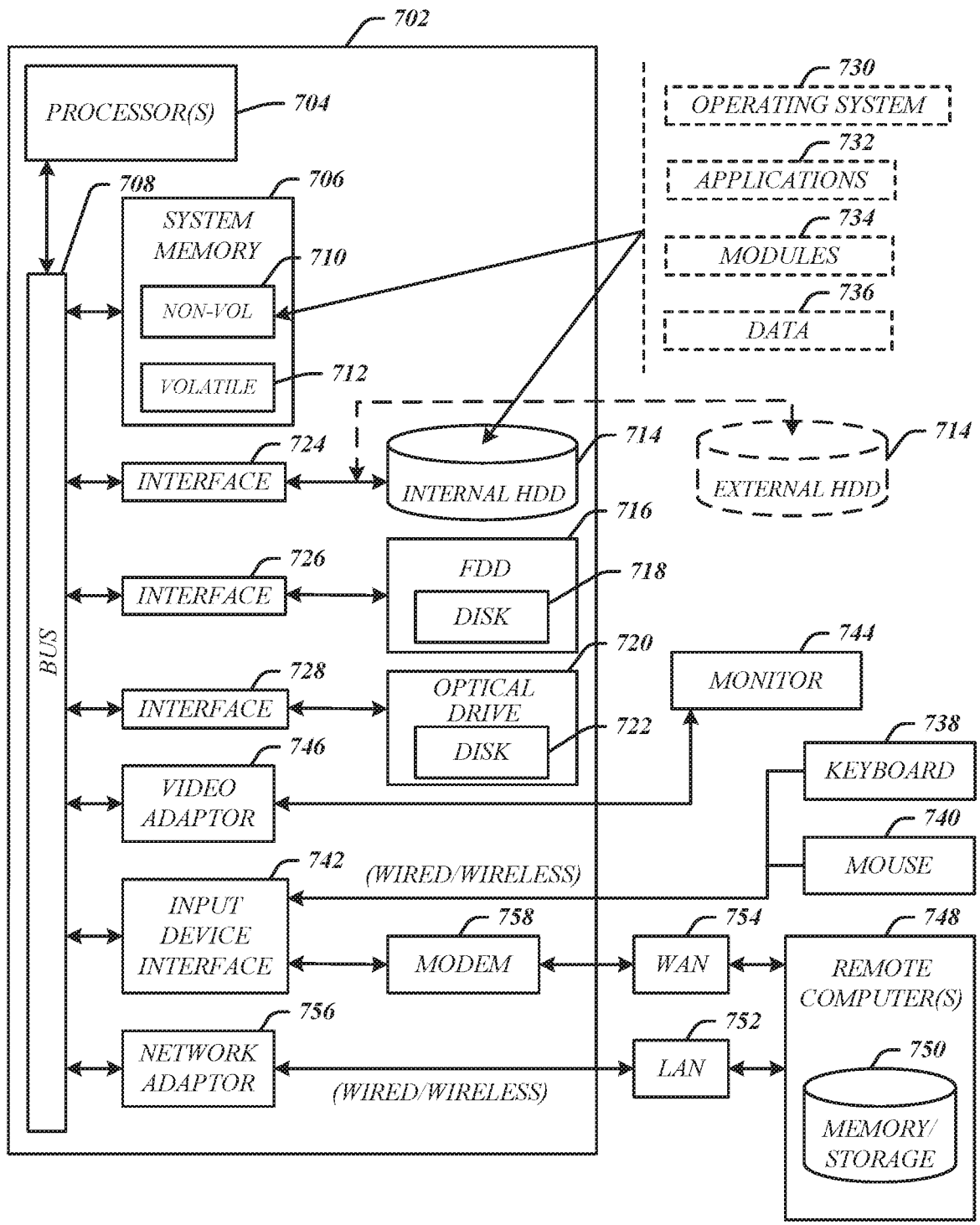
FIG. 7 illustrates an example computing architecture of a computing device in accordance with one or more embodiments.

FIG. 7 illustrates an embodiment of an exemplary computing architecture 700, e.g., of a computing device, such as a desktop computer, laptop, tablet computer, mobile computer, smartphone, etc., suitable for implementing various embodiments as previously described. In one embodiment, the computing architecture 700 may include or be implemented as part of a system, which will be further described below. In examples, one or more computing devices and the processing circuitries thereof may be configured to at least execute, support, or provide the cardswap initiation functionalities on the financial company side (via backed server computers) and/or the banking app and interface to allow the cardswap on the customer side (via mobile computers, smartphones, etc.).

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, a field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi® (or Wireless Fidelity), WiMax®, and Bluetooth® wireless technologies, among others. Thus, the communication can be a predefined structure as with a conventional network or simply an ad hoc communication between at least two devices. Wi-Fi® networks use radio technologies called IEEE 802.118 (a, b, g, n, etc.) to provide secure, reliable, fast wireless connectivity. A Wi-Fi® network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
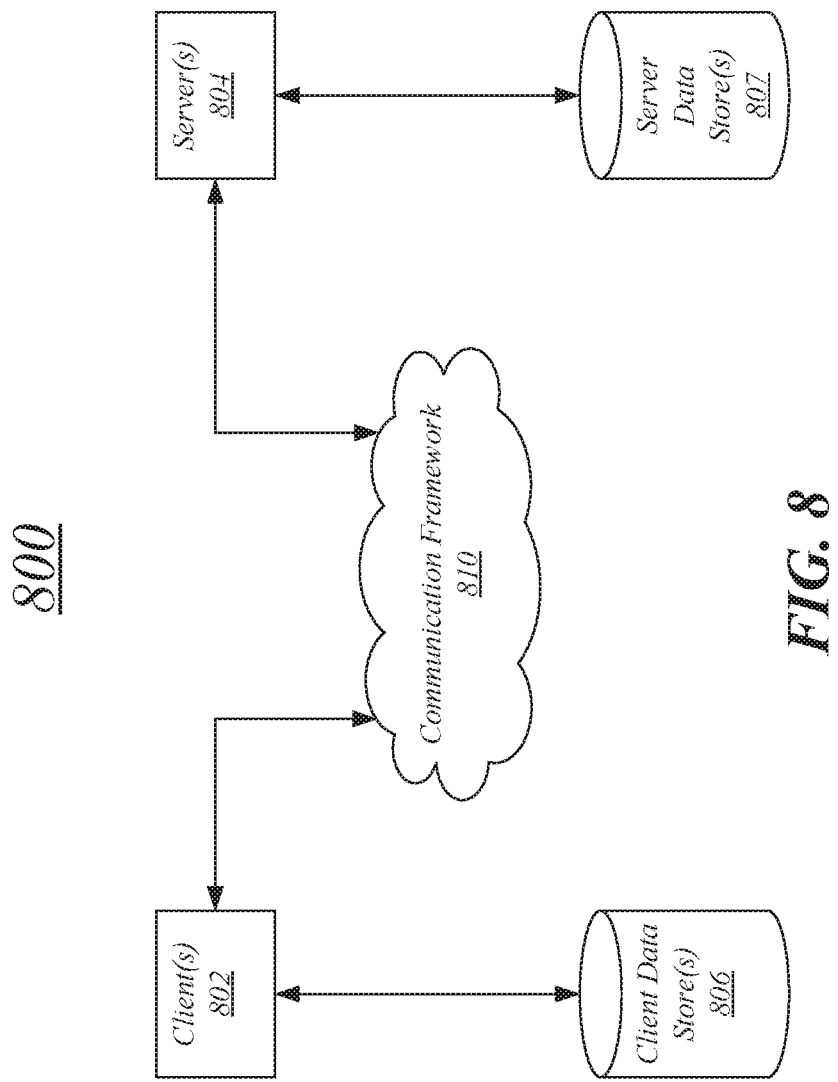
FIG. 8 illustrates an example communications architecture in accordance with one or more embodiments.

FIG. 8 is a block diagram depicting an exemplary communications architecture 800 suitable for implementing various embodiments. For example, one or more computing devices may communicate with each other via a communications framework, such as a network. At least a first computing device connected to the network may be a customer computing device, such as a desktop computer, laptop, tablet computer, smartphone, etc. Thus, the customer may use the first computing device to open a banking app. At least a second computing device connected to the network may be one or more server computers, which may be implemented as a back-end server or a cloud-computing server. For example, the cardswap initiation functionalities (e.g., analyzing customer data, training the reissue analytics model, determining likely reissue events for customers, initiating cardswap, etc.) be provisioned on one or more back-end server computers.

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system for initiating a cardswap, the system comprising:
   one or more computing devices, wherein the one or more computing devices comprises:
   a memory to store instructions; and
   processing circuitry, coupled with the memory, operable to execute the instructions, that when executed, cause the processing circuitry to:
      receive customer transaction data associated with a customer;
      determine, via a machine learning model, whether a reissue event has occurred, likely occurred, or will occur for the customer based at least in part on the customer transaction data, wherein the reissue event is a reissuance of a third-party card associated with the customer;
      initiate, based on the determination, the cardswap by identifying one or more cards associated with the customer, wherein the one or more cards includes one or more of the following: (i) a customer credit card, (ii) a customer debit card, and (iii) a customer virtual card, wherein the identified one or more cards do not include third-party cards;
      present the identified one or more cards to the customer;
      receive a selection from the customer of a card from the presented one or more cards;
      identify, based on the customer transaction data, a plurality of third-party websites or web applications where the third-party card is stored to process payments; and
      automatically perform the cardswap based on the selection of the card, wherein the performance of the cardswap comprises executing a script to:
         navigate, by a web browser, to each identified third-party website or web application; and
         replace, by the web browser based on a determination that each of the plurality of third-party websites or web applications includes payment token information, the third-party card on file at each identified third-party website or web application with the selected card by populating an account number of the selected card into a respective form field on each identified third-party website or web application, and
      wherein the machine learning model is trained using at least transaction activity information associated with customer cards after customer third-party card reissuances, the transaction activity information including at least: use of the customer cards at a frequency after dates corresponding to the customer third-party card reissuances that is greater than a frequency of use of the customer cards before the dates corresponding to the customer third-party card reissuances, and use of the customer cards at new merchants after the dates corresponding to the customer third-party card reissuances.

2. The system of claim 1, wherein the customer virtual card is a virtual number associated with a customer credit card, a customer debit card, or a customer account, wherein the performance of the cardswap further comprises executing the script to:
  determine another third-party website or web application does not include payment token information; and
  refrain from populating the account number into the form field on the another third-party website or web application based on the determination that the another third-party website or web application does not include payment token information.

3. The system of claim 2, wherein the machine learning model includes a classification model, wherein the script is executed by a browser extension of the web browser.

4. The system of claim 1, wherein the machine learning model is further trained using information related to: (i) changes in spending patterns, (ii) changes in spending volume (iii) recurring charges on the customer cards, and (iv) placing the customer cards on file with one or more companies by the customers.

5. The system of claim 3, wherein the classification model is a logistic regression model, a decision tree model, a random forest model, or a Bayes model.

6. The system of claim 3, wherein the classification model is based on a convolutional neural network (CNN) algorithm, a recurrent neural network (RNN) algorithm, or a hierarchical attention network (HAN) algorithm.

7. The system of claim 1, wherein the identified one or more cards are presented to the customer via an e-mail, a text message, a call, a notification message, and/or a mobile banking application message.

8. The system of claim 1, wherein the customer transaction data includes one or more of the following: (i) a purchase, (ii) a financial transaction, (iii) a withdrawal, (iv) a deposit, (v) a recurring charge, and (vi) a one-time charge.

9. The system of claim 8, wherein the processing circuitry is further caused to determine which one of the identified one or more cards are to be presented for the cardswap.

10. The system of claim 1, wherein the one or more cards are associated with a first company, and wherein the third-party card is associated with a second company different than the first company.

11. The system of claim 10, wherein the first company is a financial company and the second company is a competitor of the financial company.

12. The system of claim 1, wherein the cardswap is performed on or for one or more of the following: (i) an online retailer, (ii) an online media-service provider, (iii) an online subscription, (iv) an online newspaper or periodical, (v) a social media service, (vi) an online gaming service, (vii) a ridesharing service, (viii) a hospitality service, and (ix) an online food ordering service.

13. A non-transitory computer-readable storage medium storing computer-readable program code executable by a processor to:
  determine, via a machine learning model, whether a reissue event has occurred, likely occurred, or will occur for a customer based at least in part on customer transaction data, wherein the reissue event is a reissuance of a third-party card associated with the customer;
  identify, based on the determination, one or more cards associated with the customer, wherein the one or more cards includes one or more of the following: (i) a customer credit card, (ii) a customer debit card, and (iii) a customer virtual card;
  send the customer a message or a notification for swapping the third-party card with the identified one or more cards;
  identify, based on the customer transaction data, a plurality of third-party websites or web applications where the third-party card is stored to process payments; and
  automatically perform a cardswap based on a response to the message or the notification from the customer selecting of a card from the identified one or more cards, wherein the performance of the cardswap comprises executing a script to:
    navigate, by a web browser, to each identified third-party website or web application; and
    replace, by the web browser based on a determination that each of the plurality of third-party websites or web applications includes payment token information, the third-party card on file at each identified third-party website or web application with the selected card by populating an account number of the selected card into a respective form field on each identified third-party website or web application, and
  wherein the machine learning model is trained using at least transaction activity information associated with customer cards after customer third-party card reissuances, the transaction activity information including at least: use of the customer cards at a frequency after dates corresponding to the customer third-party card reissuances that is greater than a frequency of use of the customer cards before the dates corresponding to the customer third-party card reissuances, and use of the customer cards at new merchants after the dates corresponding to the customer third-party card reissuances.

14. A method, comprising:
  receiving, by a processor of a device, customer transaction data associated with a customer;
  determining, via a machine learning model executing on the processor, whether a reissue event has occurred, likely occurred, or will occur for the customer based at least in part on the customer transaction data, wherein the reissue event is a reissuance of a third-party card associated with the customer;
  initiating, by the processor based on the determination, a cardswap by identifying one or more cards associated with the customer, wherein the one or more cards includes one or more of the following: (i) a customer credit card, (ii) a customer debit card, and (iii) a customer virtual card;
  presenting, by the processor, the identified one or more cards to the customer;
  receiving, by the processor, a selection from the customer of a card from the presented one or more cards;
  identifying, by the processor based on the customer transaction data, a plurality of third-party websites or web applications where the third-party card is stored to process payments; and
  automatically performing the cardswap by the processor based on the selection of the card, wherein the performance of the cardswap comprises executing a script to:
    navigate, by a web browser executing on the browser, to each identified third-party website or web application; and replace, by the web browser based on a determination that each of the plurality of third-party websites or web applications includes payment token information, the third-party card on file at each identified third-party website or web application with the selected card by populating an account number of the selected card into a respective form field on each identified third-party website or web application, and wherein the machine learning model is trained using at least transaction activity information associated with customer cards after customer third-party card reissuances, the transaction activity information including at least: use of the customer cards at a frequency after dates corresponding to the customer third-party card reissuances that is greater than a frequency of use of the customer cards before the dates corresponding to the customer third-party card reissuances, and use of the customer cards at new merchants after the dates corresponding to the customer third-party card reissuances.

15. The method of claim 14, wherein the customer virtual card is a virtual number associated with a customer credit card, a customer debit card, or a customer account, wherein the performance of the cardswap further comprises executing the script to:

determine another third-party website or web application does not include payment token information; and refrain from populating the account number into the form field on the another third-party website or web application based on the determination that the another third-party website or web application does not include payment token information.

16. The method of claim 15, wherein the machine learning model includes a classification model, wherein the script is executed by a browser extension of the web browser.

17. The method of claim 16, wherein the machine learning model is further trained using information related to: (i) changes in spending patterns, (ii) changes in spending volume (iii) recurring charges on the customer cards, and (iv) placing the customer cards on file with one or more companies by the customers.

18. The method of claim 17, wherein the classification model is a logistic regression model, a decision tree model, a random forest model, or a Bayes model.

19. The method of claim 14, wherein the machine learning model is further trained using information related to: (i) changes in spending patterns, (ii) changes in spending volume (iii) recurring charges on the customer cards, and (iv) placing the customer cards on file with one or more companies by the customers.

20. The method of claim 19, further comprising:

identifying, by the machine learning model, the one or more cards associated with the customer based on: (i) a respective balance of each of the one or more cards, (ii) a respective amount of available credit of each of the one or more cards, (iii) whether each of the one or more cards were previously used for a previous cardswap operation, and (iv) a respective expiration date of each of the one or more cards.

* * * * *